Figure 1:
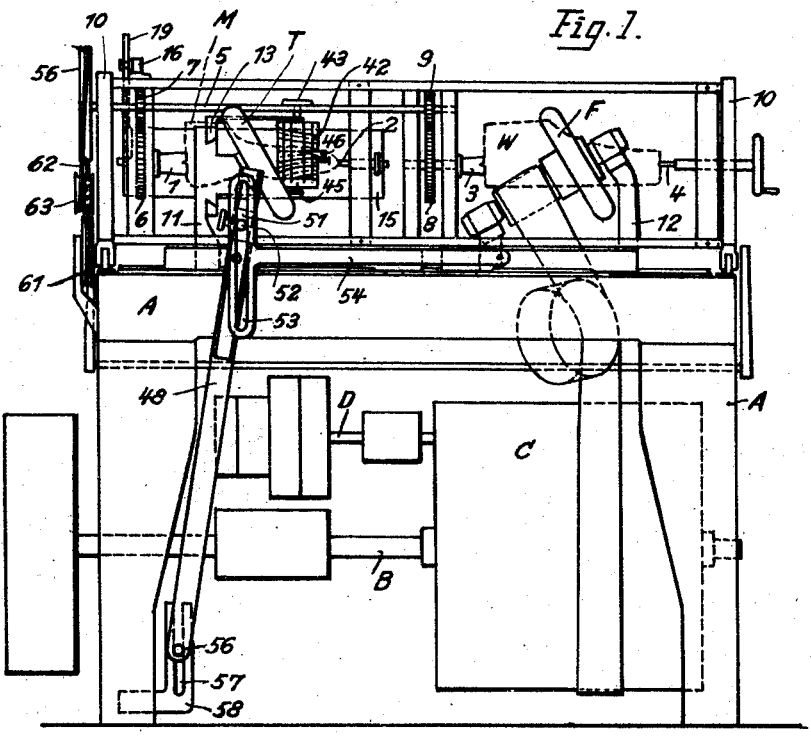

July 14, 1925.

C. BLACK ET AL 1,545,543

MACHINE FOR COPYING SHOE LASTS AND OTHER IRREGULAR BODIES

Filed Aug. 6, 1923

2 Sheets-Sheet 1

INVENTORS.
Carl Black
Carl Benscheidt, Jr
By their Attorney,
Nelson W. Howard

July 14, 1925.
C. BLACK ET AL
1,545,543
MACHINE FOR COPYING SHOE LASTS AND OTHER IRREGULAR BODIES
Filed Aug. 6, 1923
2 Sheets-Sheet 2

INVENTORS.
Carl Black
Carl Benscheidt, Jr.
By their Attorney
Nelson W. Howard

Patented July 14, 1925.

1,545,543

UNITED STATES PATENT OFFICE.

CARL BLACK, OF MONKEBERG, AND CARL BENSCHEIDT, JR., OF ALFELD-ON-THE-LEINE, GERMANY, ASSIGNORS TO UNITED SHOE MACHINERY CORPORATION, OF PATERSON, NEW JERSEY, A CORPORATION OF NEW JERSEY.

MACHINE FOR COPYING SHOE LASTS AND OTHER IRREGULAR BODIES.

Application filed August 6, 1923. Serial No. 656,142.

*To all whom it may concern:*

Be it known that we, CARL BLACK and CARL BENSCHEIDT, Jr., citizens of Germany, residing at Monkeberg and Alfeld-on-the Leine, Germany, have invented certain new and useful Improvements in Machines for Copying Shoe Lasts and Other Irregular Bodies (for which I have filed an application in Germany July 27, 1922), of which the following is a specification.

This invention relates to pattern copying lathes and is disclosed in connection with a lathe for turning shoe lasts of the type set forth in United States Letters Patent No. 544,891, granted Aug. 20, 1895, on application of W. F. Gilman.

Last lathes have ordinarily been provided with a cutter head about ten inches in diameter, a construction which possesses marked economic and manufacturing advantages. Difficulty has been experienced in the use of last lathes of this type in reproducing concavities of sharp curvature in lasts, for the reason that the model wheel of such a last lathe (which is of the same diameter and on an axis parallel to that of the model) bridges over such concavities and consequently no concavity of sharper curvature than that of the model wheel will be reproduced in the block. While the construction and use of a model wheel of sharp curvature offers no great difficulty, that of a similar cutter does. Such concavities have to be finished out later by hand, which is a source of considerable expense and inaccuracy. The present invention meets this difficulty by tilting the axis of the cutter until it stands at a substantial vertical angle with the rotation axis of the block or work piece. Thus the effective shape of the cutter, which is the projection of its periphery on a plane perpendicular to the rotation axis of the block, becomes an ellipse with a point at or near its end in contact with the block, this end having obviously a much sharper curvature than that of the cutter itself. The model wheel, for most accurate reproduction, will be of the same size and have the same relation to the rotation axis of the model. The difficulty is therefore minimized without loss of the advantages of the large cutter head construction.

Therefore, an important feature of the invention consists in a copying lathe having a model wheel, a cutter, and means for holding and rotating a model and block against them respectively, the axis of the cutter being vertically inclined to that of the block in order to transform the effective contour of the cutter to an ellipse so situated that that portion of the ellipse which is in contact with the block is of substantially sharper curvature than the periphery of the cutter itself. Thus we are able to secure accurate reproduction of sharp concavities with a large cutter head of cheap construction.

Figure 2:
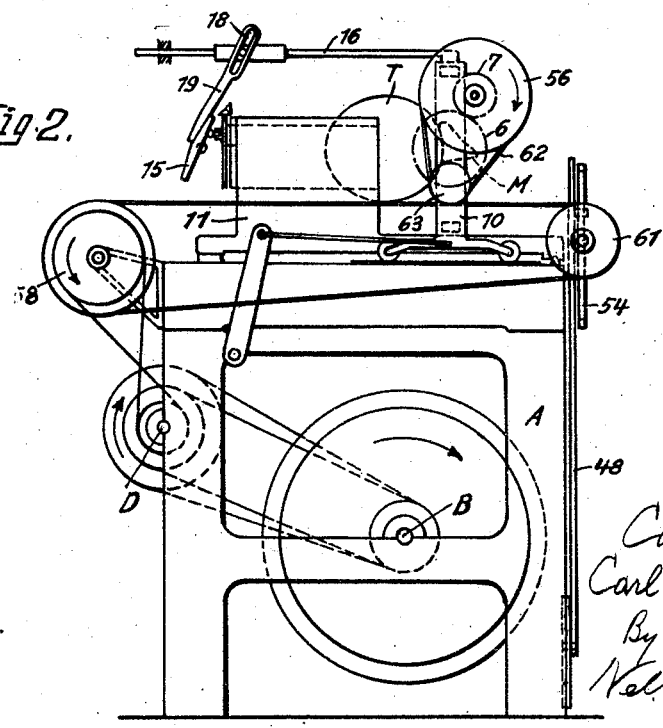
Figure 3:
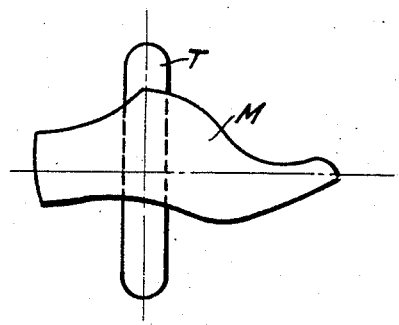
Figure 4:
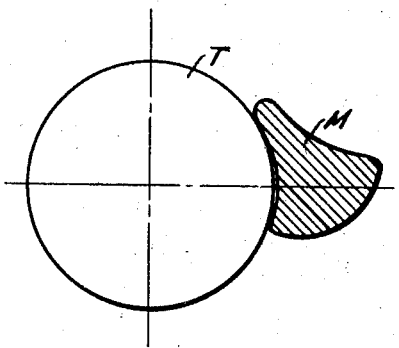
Figure 5:
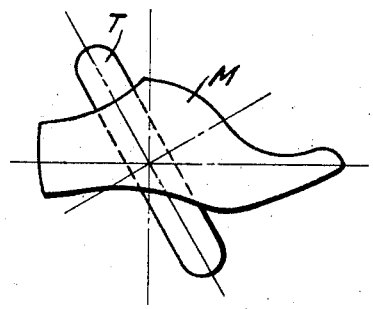
Figure 6:
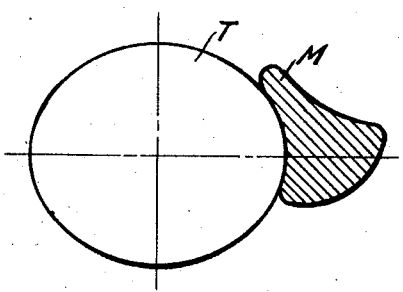

This and other features of the invention comprising certain combinations and arrangements of parts will be understood from the following description of a preferred embodiment thereof selected for purposes of illustration and shown in the accompanying drawings in which, Figure 1 is a front elevation;
Fig. 2 is a left hand side elevation;
Figs. 3 and 4 are diagrams illustrating the ordinary cutter head arrangement, Fig. 3 being a front, and Fig. 4 a side elevation; and Figs. 5 and 6 are similar diagrams illustrating the cutter head arrangement in accordance with the preferred embodiment of the present invention, Fig. 5 being a front and Fig. 6 a side elevation.

In Figs. 3–6, T represents the model wheel (or cutter) and M represents the model (or block, or work piece) respectively.

Referring to Figs. 1 and 2, which show the complete machine, the last W is cut from a pattern M, commonly termed a "model," by means of a high-speed milling head or cutter F. The pattern M is secured between dogs 1, 2; the work between dogs 3 and 4; and both are uniformly rotated from a shaft 5 by gearing 6, 7 and 8, 9. Their axes of rotation are collinear, as is well known. If it is desired to produce from a right pattern a left last, the direction of rotation of the wood block M is made opposite to the direction of rotation of the pattern by cutting in a reversing gear, in the usual manner. The two supporting devices for the pattern and the work are secured in a carriage 10, which is capable of moving on a rectilinear slide upon the frame A in a direction at right angles to the axis of pattern and work. The pattern M is pressed against

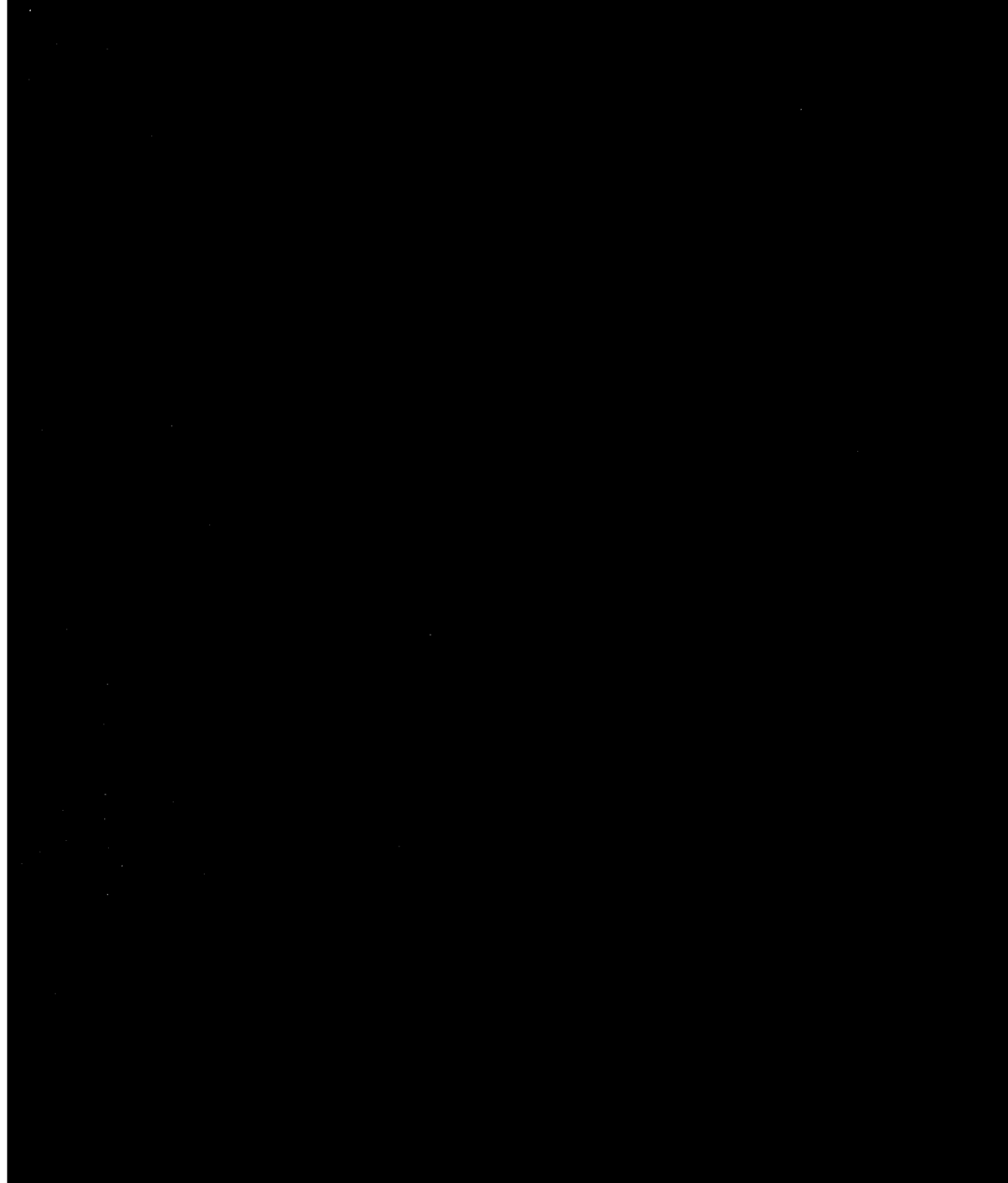

by that portion of the ellipse which is in contact with the block is of substantially sharper curvature than the periphery of the cutter itself.

3. In a pattern copying lathe, a model wheel and a cutter, and a model holder and a block holder arranged to hold a model and a block for rotation against them respectively, the axes of rotation of the model wheel and cutter being tilted at oblique angles to the axes of the model and block in planes not intersecting the model and block axes respectively.

4. In a pattern copying lathe, a model wheel and a cutter, and a model holder and a block holder arranged to hold a model and a block for rotation against them respectively, the axes of rotation of the model wheel and cutter being tilted out of parallelism to the axes of the model and block in planes perpendicular to the planes defined by the model axis and model wheel center, and the block axis and the cutter center, respectively.

5. In a pattern copying lathe, model and block holders arranged to rotate on horizontal axes, and a model wheel and a rotating cutter, the axis of rotation of the cutter forming a vertical angle with the axis of the block.

In testimony whereof we affix our signatures in presence of two witnesses.

CARL BLACK.
CARL BENSCHEIDT, Jr.

Witnesses:
Francis J. Dugan,
Chas. S. Graham.